US008378801B1

(12) United States Patent
Freeman et al.

(10) Patent No.: US 8,378,801 B1
(45) Date of Patent: Feb. 19, 2013

(54) SYSTEM FOR DETERMINING ABANDONMENT OF CHILD IN UNATTENDED VEHICLE

(76) Inventors: James C. Freeman, Hayward, CA (US); Taryn Freeman, Hayward, CA (US)

(*) Notice: Subject to any disclaimer, the term of this patent is extended or adjusted under 35 U.S.C. 154(b) by 323 days.

(21) Appl. No.: 12/878,355

(22) Filed: Sep. 9, 2010

(51) Int. Cl.
    *B60R 25/10* (2006.01)
(52) U.S. Cl. ......... 340/426.17; 340/426.13; 340/426.15; 340/457.1
(58) Field of Classification Search ............. 340/426.13, 340/426.15, 426.17
    See application file for complete search history.

(56) References Cited

U.S. PATENT DOCUMENTS

| | | | |
|---|---|---|---|
| 5,870,019 A * | 2/1999 | Chen | ........................ 340/426.17 |
| 6,489,889 B1 | 12/2002 | Smith | |
| 6,812,844 B1 | 11/2004 | Burgess | |
| 7,265,671 B1 | 9/2007 | Valles et al. | |
| 7,408,445 B1 | 8/2008 | Cunningham | |
| 7,466,217 B1 | 12/2008 | Johnson et al. | |
| 2004/0140890 A1 | 7/2004 | Hartmann et al. | |
| 2005/0099285 A1 | 5/2005 | Prevatt et al. | |
| 2008/0055064 A1* | 3/2008 | Keith et al. | ................ 340/457.1 |
| 2012/0007741 A1* | 1/2012 | Laffey et al. | ................ 340/573.1 |

* cited by examiner

*Primary Examiner* — Benjamin C Lee
*Assistant Examiner* — Thomas Duah

(57) ABSTRACT

A system for determining abandonment of a child or infant in a vehicle. The system features a remote key in communication with sensors operatively connected to seatbelts in a vehicle. If a user presses the lock button on the remote key the sensors determine if any seatbelt has been left engaged. If a seatbelt is engaged an alarm is activated on the remote key. If no seatbelt is left engaged, the vehicle doors become locked. To override the alarm, and override button must be pushed on the remote key. An unlock button on the remote key unlocks the vehicle doors and the system is reset.

8 Claims, 4 Drawing Sheets

SYSTEM FOR DETERMINING ABANDONMENT OF CHILD IN UNATTENDED VEHICLE

FIELD OF THE INVENTION

The present invention is directed to a vehicle security system with an incorporated sensor in each seatbelt to detected locked seatbelts upon locking of the vehicle via a remote key system.

BACKGROUND OF THE INVENTION

Many infants and children have suffered painful an unnecessary deaths due to being left in a vehicle. The present invention features a system for determining abandonment of a child or infant in a vehicle. The system incorporates sensors in the seatbelts that determine whether the seatbelts are locked at the time a user locks the vehicle from the outside (e.g., via a remote key). If a seatbelt is locked, an alarm is activated after a certain length of time (e.g., 3 seconds), alerting the user that he/she needs to check the interior of the vehicle. If the vehicle is empty, the user can press a button to override the alarm, thereby locking the vehicle.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a system for determining abandonment of a child or infant in a vehicle. In some embodiments, the system comprises a remote key comprising a lock button for effectively remotely locking a vehicle, an unlock button for effectively remotely unlocking a vehicle, and an override button; a first receiver, a first transmitter, and a speaker component each disposed in the remote key, the speaker component is adapted to emit an alarm sound; a remote microprocessor operatively connected to each the lock button, the unlock button, the override button, the first receiver, the first transmitter, and the speaker component; a plurality of sensors each operatively connected to a seatbelt in a vehicle, the sensors each function to determine if the seatbelt engaged; a seatbelt microprocessor operatively connected to each sensor and to a second receiver, the second receiver is adapted to receive signals from the first transmitter; and a second transmitter operatively connected to the seatbelt microprocessor, the second transmitter is adapted to send signals to the first receiver in the remote key.

In some embodiments, the remote microprocessor is configured to receive a first lock input signal from the lock button when the lock button is pressed whereupon the remote microprocessor generates a first transmitter output command to the first transmitter to cause the first transmitter to send a first lock transmitter signal to the second receiver, the seatbelt microprocessor is configured to receive a second lock input signal from the second receiver when the second receiver receives the first lock transmitter signal whereupon the seatbelt microprocessor sends a first sensor output command to the sensors to cause the sensors to detect an engaged seatbelt after a pre-set time, wherein the seatbelt microprocessor is configured to receive a first alarm input signal from the sensors if a sensor detects an engaged seatbelt whereupon the microprocessor generates a first alarm output command to the second transmitter to cause the second transmitter to send a first alarm transmitter signal to the first receiver, the first receiver sends a second alarm input signal to the remote microprocessor when the first receiver receives the first alarm transmitter whereupon the remote microprocessor sends a first speaker output command to the speaker component to cause the speaker component to emit the alarm sound, wherein the seatbelt microprocessor is configured to send a first door lock signal to a door lock system of the vehicle to activate the door lock system to lock vehicle doors if the seatbelt microprocessor does not receive the first alarm input signal from the sensors after the pre-set time.

In some embodiments, the remote microprocessor is configured to receive a first unlock input signal from the unlock button when the unlock button is pressed whereupon the remote microprocessor generates a second transmitter output command to the first transmitter to cause the first transmitter to send a first unlock transmitter signal to the second receiver, the seatbelt microprocessor is configured to receive a second unlock input signal from the second receiver when the second receiver receives the first unlock transmitter signal whereupon the seatbelt microprocessor sends an first door unlock signal to the door lock system of the vehicle to deactivate the door lock system to unlock the vehicle doors. In some embodiments, the remote microprocessor is configured to receive a first unlock input signal from the unlock button when the unlock button is pressed whereupon the remote microprocessor generates a second speaker output command to the speaker component to cause the speaker component to not emit the alarm sound.

In some embodiments, the remote microprocessor is configured to receive a first override input signal from the override button when the override button is pressed whereupon the remote microprocessor generates a third transmitter output command to the first transmitter to cause the first transmitter to send a first override transmitter signal to the second receiver, the seatbelt microprocessor is configured to receive a second override input signal from the second receiver when the second receiver receives the first override transmitter signal whereupon the seatbelt microprocessor send a second door lock signal to the door lock system of the vehicle to activate the door lock system to the lock vehicle doors. In some embodiments, the remote microprocessor is configured to receive a first override input signal from the override button when the override button is pressed whereupon the remote microprocessor generates a third speaker output command to the speaker component to cause the speaker component to not emit the alarm sound.

In some embodiments, the remote key further comprises a power source. In some embodiments, the remote key further comprises a trunk opening button. In some embodiments, the remote key further comprises a panic button. In some embodiments, the pre-set time is about 3 seconds. In some embodiments, the pre-set time is between about 3 to 5 seconds. In some embodiments, the pre-set time is between about 5 to 10 seconds.

In some embodiments, the seatbelt microprocessor is configured to receive a first alarm input signal from the sensors if a sensor detects an engaged seatbelt whereupon the microprocessor generates a third alarm output command to an alarm system of the vehicle to activate the alarm system.

DESCRIPTION OF PREFERRED EMBODIMENTS

Figure 1:
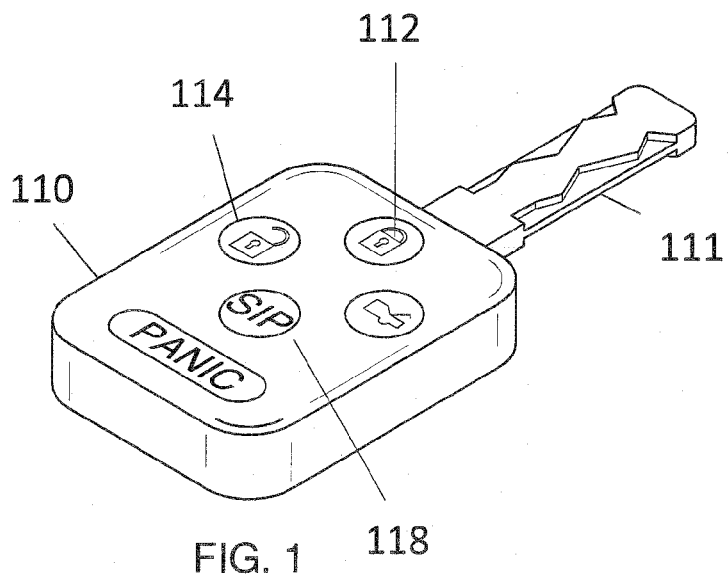
FIG. 1 is a top perspective view of the key of the system of the present invention.
Figure 2:
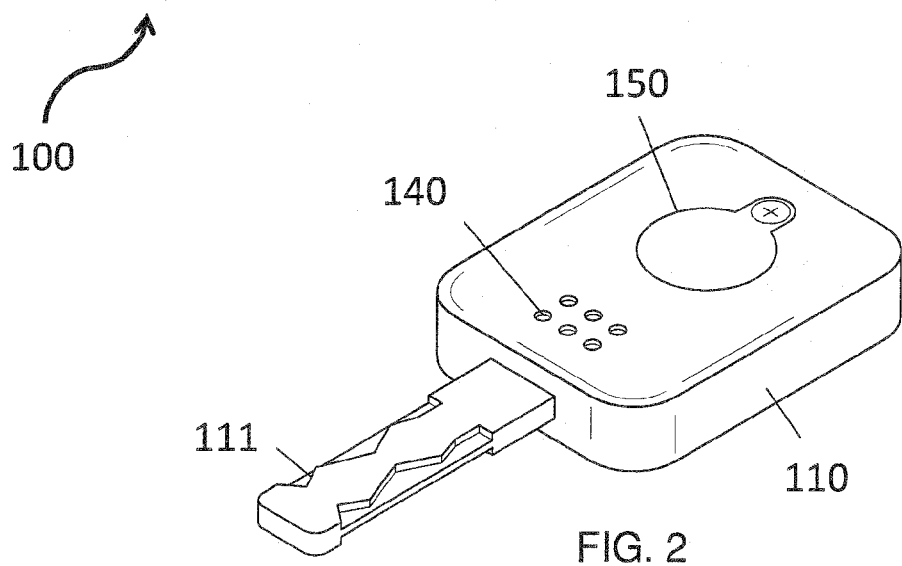
FIG. 2 is a bottom perspective view of the key of the system of the present invention.
Figure 3:
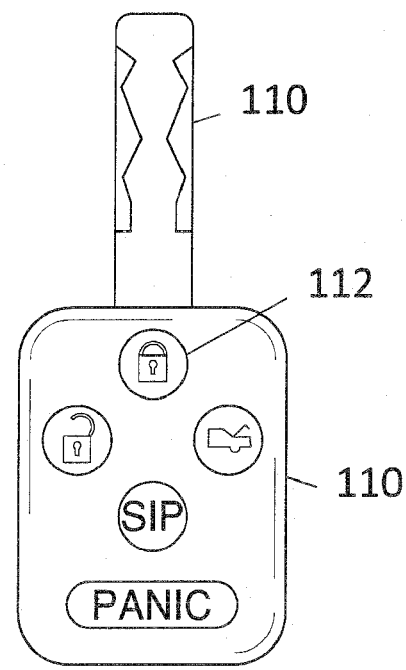
FIG. 3 is a top view of the key of the system of the present invention.
Figure 4:
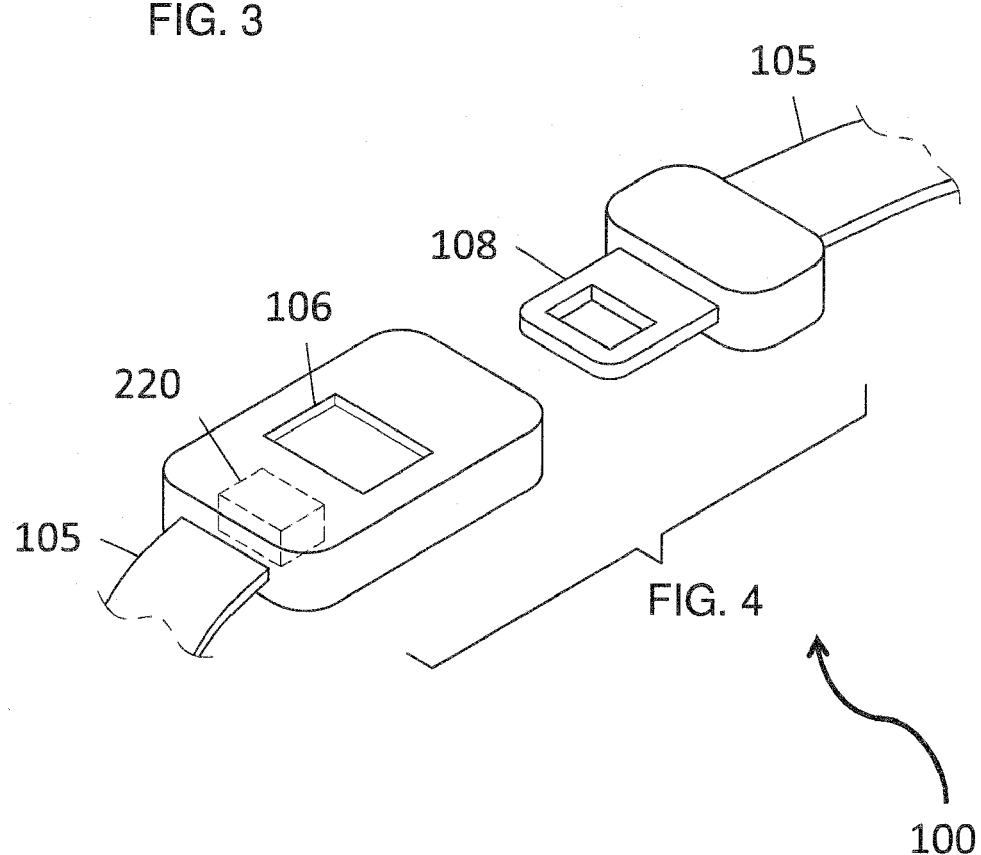
FIG. 4 is a perspective view of the seatbelt of the system of the present invention.
Figure 5:
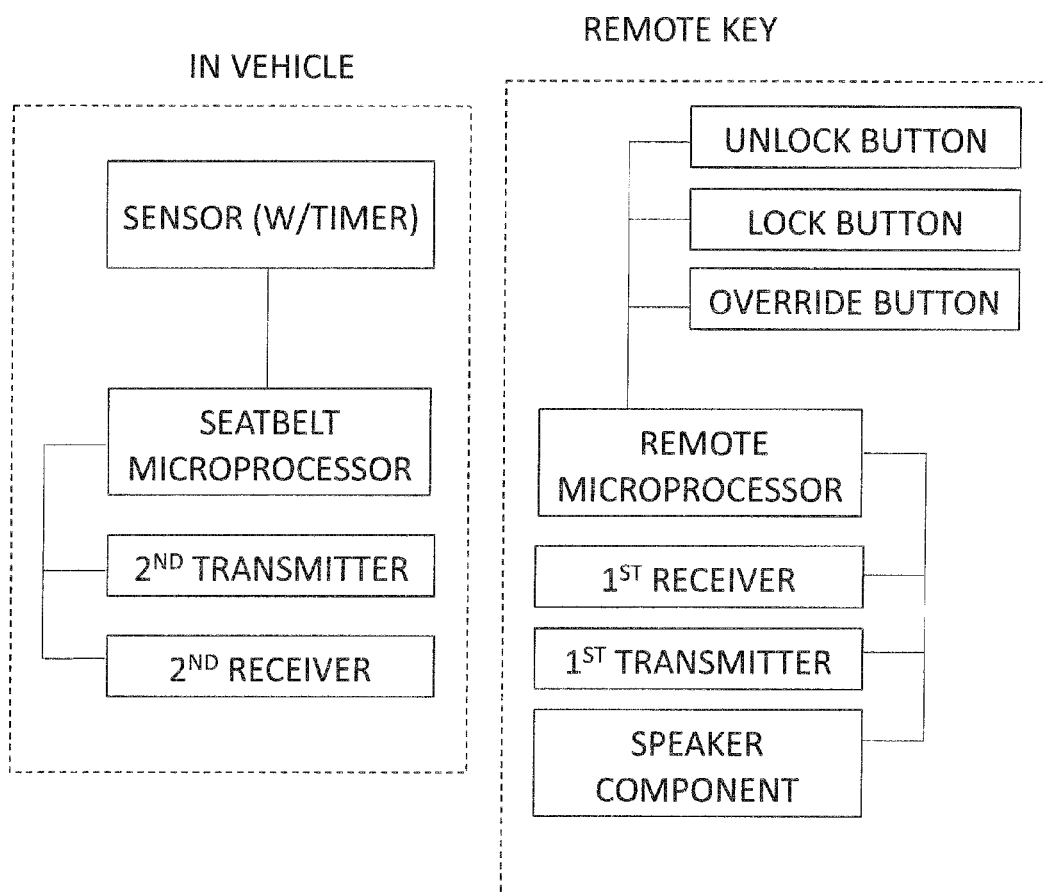
FIG. 5 is a schematic representation of electrical components of the system of the present invention.

Referring now to FIGS. 1-6, the present invention features a system 100 for determining abandonment of a child or infant in a vehicle. The system incorporates sensors in the seatbelts that determine whether the seatbelts are locked at the time a user locks the vehicle from the outside (e.g., via a remote key). If a seatbelt is locked, an alarm is activated after a certain length of time (e.g., 3 seconds), alerting the user that he/she needs to check the interior of the vehicle. If the vehicle is empty, the user can press a button to override the alarm, thereby locking the vehicle.

The system 100 of the present invention comprises a remote key 110 for remotely controlling the locking and unlocking of the vehicle. Such remote keys are well known to one of ordinary skill in the art. For example, the key 110 comprises a key component 111 adapted to engage the vehicle ignition, a lock button 112, and an unlock button 114 for effectively locking and unlocking the vehicle, respectively. Disposed in the remote key 110 is a remote microprocessor operatively connected to a receiver and a speaker component 140. The remote key 110 further comprises an override button 118 (e.g., "SIP button") operatively connected to the microprocessor. The remote key 110 further comprises a power source (e.g., a battery), which may be stored in a battery compartment 150, for example. The speaker component 140 is adapted to emit an alarm sound. In some embodiments, the remote key 110 further comprises a trunk opening button and a panic button.

The system 100 of the present invention comprises a plurality of sensors each operatively connected to a seatbelt. The sensors function to determine whether or not the seatbelt is locked. Such sensors are well known to one of ordinary skill in the art. For example, the sensor may detect whether or not the lock portion 108 of the seatbelt 105 is engaged with the button 106. Each sensor is operatively connected to a seatbelt microprocessor, which is operatively connected to a transmitter 220. The transmitter 220 is adapted to send an alert signal to the receiver in the remote key 110.

If a user presses the lock button 112 on the remote key 110 after exiting the vehicle, the vehicle locks. The sensors are also activated at this time. The sensors determine if a seatbelt has been left locked, indicating that a child has been left in the car. If the sensors do not detect a locked seatbelt, no signal is sent to the seatbelt microprocessor. If a sensor detects a locked seatbelt (after a pre-set time, e.g., 3 seconds, 4 seconds, etc.), the sensor sends an input signal to the seatbelt microprocessor whereupon the seatbelt microprocessor generates an output command to the transmitter to cause the transmitter to send the alert signal to the receiver. Upon receipt of the alert signal, the receiver sends an input signal to the remote microprocessor whereupon the remote microprocessor generates an output command to the speaker component 150 to activate the speaker component 150. The alarm sound emitted from the speaker component 150 alerts the user that he/she should check the interior of the vehicle for a child. After the user has checked the interior of the vehicle and no one is there, he/she presses the override button 118 (e.g., "SIP button"). The override button 118 (e.g., "SIP button") silences the alarm and in some embodiments, locks the vehicle. In some embodiments, the override button 118 (e.g., "SIP button") is not a primary lock button for the vehicle but can be used as a secondary lock button. The system 100 resets after a user presses the unlock button 114.

Figure 6:
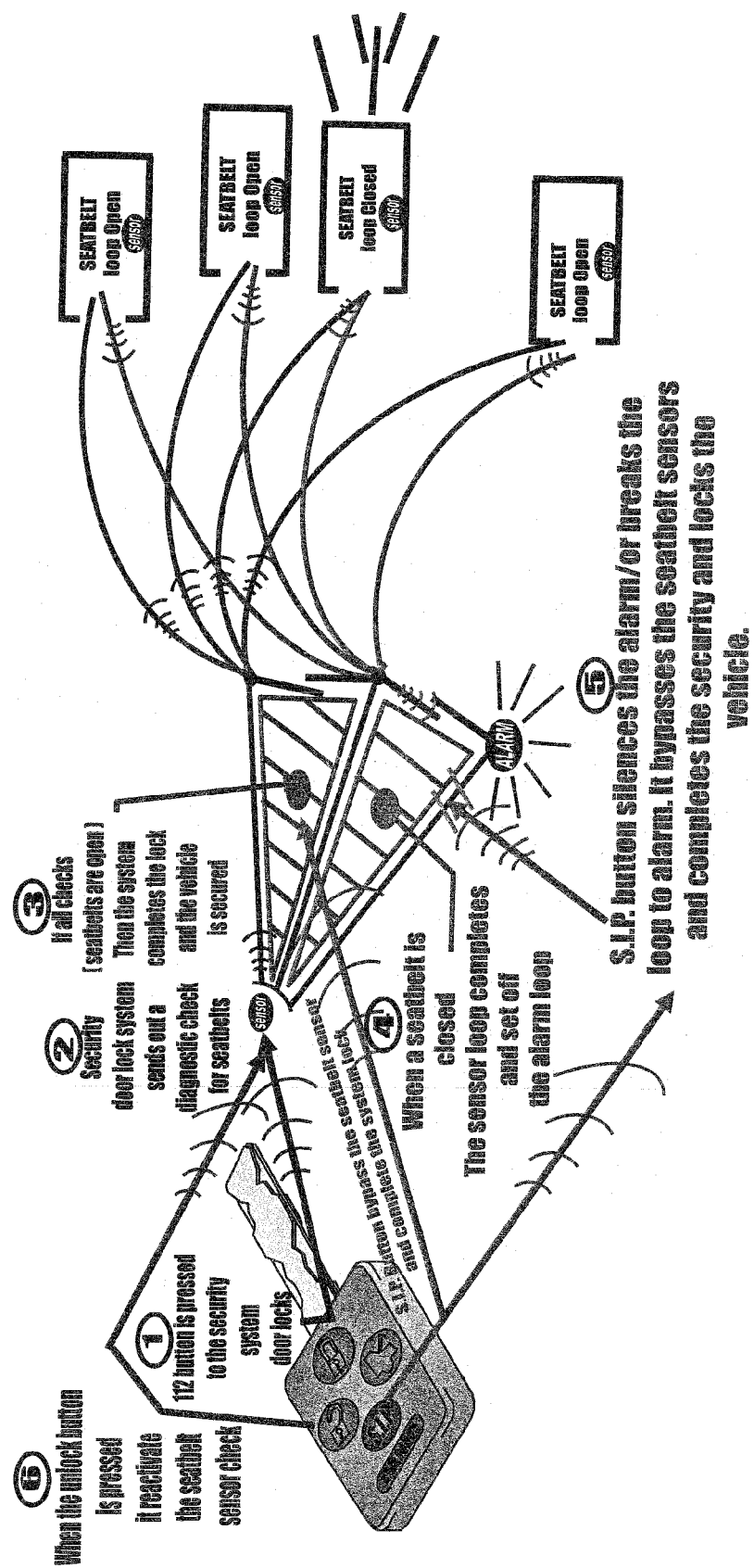
FIG. 6 is a schematic representation of how the system of the present invention works.

As shown in FIG. 6, the lock button 112 on the remote key 110 is pressed, which causes the sensors to detect engaged seatbelts (e.g., the sensors do a diagnostic check for seatbelts). If all seatbelts are open (disengaged), the system completes the locking of the vehicle and the vehicle is secured. If a seatbelt is locked (e.g., engaged) the sensor loop completes and sets off the alarm loop (e.g., the speaker component is activated). The override button (SIP button) silences the alarm (e.g., breaks the loop to the alarm). It bypasses the seatbelt sensors and completes the security and locks the vehicle. When the unlock button is pressed, the seatbelt sensor check is reset.

The disclosures of the following U.S. patents are incorporated in their entirety by reference herein: U.S. Pat. Application No. 2005/0099285; U.S. Pat. No. 6,489,889; U.S. Pat. No. 6,812,844; U.S. Pat. Application No. 2004/0140890; U.S. Pat. No. 7,466,217; U.S. Pat. No. 7,408,445; U.S. Pat. No. 7,265,671.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

It is such a tragedy when a child is lost due to a humans error. Even in our fast pace society where we all have so much on our agenda, and it's all to be done in the NOW. When a loss occur, it is hard to put accountability to the cause. Then it is just closed as lost. This also is a reason that we are adding technology to help us prevent the loss. And where this system is on board and is in enabled mode; and it be determined the S.I.P. alarm was by-passed or silenced; and a life is lost. Then criminal charges may apply.

What is claimed is:

1. A system for determining abandonment of a child or infant in a vehicle, said system comprising:
   (a) a remote key comprising a lock button for effectively remotely locking a vehicle, an unlock button for effectively remotely unlocking a vehicle, and an override button;
   (b) a first receiver, a first transmitter, and a speaker component each disposed in the remote key, the speaker component is adapted to emit an alarm sound;
   (c) a remote microprocessor operatively connected to each the lock button, the unlock button, the override button, the first receiver, the first transmitter, and the speaker component;
   (d) a plurality of sensors each operatively connected to a seatbelt in a vehicle, the sensors each function to determine if the seatbelt engaged;

(e) a seatbelt microprocessor operatively connected to each sensor and to a second receiver, the second receiver is adapted to receive signals from the first transmitter; and (f) a second transmitter operatively connected to the seatbelt microprocessor, the second transmitter is adapted to send signals to the first receiver in the remote key;

wherein the remote microprocessor is configured to receive a first lock input signal from the lock button when the lock button is pressed whereupon the remote microprocessor generates a first transmitter output command to the first transmitter to cause the first transmitter to send a first lock transmitter signal to the second receiver, the seatbelt microprocessor is configured to receive a second lock input signal from the second receiver when the second receiver receives the first lock transmitter signal whereupon the seatbelt microprocessor sends a first sensor output command to the sensors to cause the sensors to detect an engaged seatbelt after a pre-set time, wherein the seatbelt microprocessor is configured to receive a first alarm input signal from the sensors if a sensor detects an engaged seatbelt whereupon the microprocessor generates a first alarm output command to the second transmitter to cause the second transmitter to send a first alarm transmitter signal to the first receiver, the first receiver sends a second alarm input signal to the remote microprocessor when the first receiver receives the first alarm transmitter whereupon the remote microprocessor sends a first speaker output command to the speaker component to cause the speaker component to emit the alarm sound, wherein the seatbelt microprocessor is configured to send a first door lock signal to a door lock system of the vehicle to activate the door lock system to lock vehicle doors if the seatbelt microprocessor does not receive the first alarm input signal from the sensors after the pre-set time;

wherein the remote microprocessor is configured to receive a first unlock input signal from the unlock button when the unlock button is pressed whereupon the remote microprocessor generates a second transmitter output command to the first transmitter to cause the first transmitter to send a first unlock transmitter signal to the second receiver, the seatbelt microprocessor is configured to receive a second unlock input signal from the second receiver when the second receiver receives the first unlock transmitter signal whereupon the seatbelt microprocessor sends an first door unlock signal to the door lock system of the vehicle to deactivate the door lock system to unlock the vehicle doors;

wherein the remote microprocessor is configured to receive a first unlock input signal from the unlock button when the unlock button is pressed whereupon the remote microprocessor generates a second speaker output command to the speaker component to cause the speaker component to not emit the alarm sound;

wherein the remote microprocessor is configured to receive a first override input signal from the override button when the override button is pressed whereupon the remote microprocessor generates a third transmitter output command to the first transmitter to cause the first transmitter to send a first override transmitter signal to the second receiver, the seatbelt microprocessor is configured to receive a second override input signal from the second receiver when the second receiver receives the first override transmitter signal whereupon the seatbelt microprocessor send a second door lock signal to the door lock system of the vehicle to activate the door lock system to the lock vehicle doors; and wherein the remote microprocessor is configured to receive a first override input signal from the override button when the override button is pressed whereupon the remote microprocessor generates a third speaker output command to the speaker component to cause the speaker component to not emit the alarm sound.

2. The system of claim 1, wherein the remote key further comprises a power source.

3. The system of claim 1, wherein the remote key further comprises a trunk opening button.

4. The system of claim 1, wherein the remote key further comprises a panic button.

5. The system of claim 1, wherein the pre-set time is about 3 seconds.

6. The system of claim 1, wherein the pre-set time is between about 3 to 5 seconds.

7. The system of claim 1, wherein the pre-set time is between about 5 to 10 seconds.

8. The system of claim 1, wherein the seatbelt microprocessor is configured to receive a first alarm input signal from the sensors if a sensor detects an engaged seatbelt whereupon the microprocessor generates a third alarm output command to an alarm system of the vehicle to activate the alarm system.

* * * * *